(12) United States Patent
Maeda et al.

(10) Patent No.: US 8,110,954 B2
(45) Date of Patent: Feb. 7, 2012

(54) ELECTRIC ROTATING MACHINE

(75) Inventors: Naohide Maeda, Chiyoda-ku (JP);
Masahiko Fujita, Chiyoda-ku (JP);
Masaki Kato, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 301 days.

(21) Appl. No.: 12/580,362

(22) Filed: Oct. 16, 2009

(65) Prior Publication Data

US 2010/0289351 A1 Nov. 18, 2010

(30) Foreign Application Priority Data

May 12, 2009 (JP) .................................. 2009-115626

(51) Int. Cl.
*H02K 9/02* (2006.01)
(52) U.S. Cl. ........................... 310/68 D; 310/64; 310/71
(58) Field of Classification Search ................. 310/64, 310/68 D, 71, 260
See application file for complete search history.

(56) References Cited

U.S. PATENT DOCUMENTS

| | | | | |
|---|---|---|---|---|
| 4,540,907 A | * | 9/1985 | Hagenlocher et al. | 310/68 D |
| 5,682,070 A | * | 10/1997 | Adachi et al. | 310/71 |
| 6,160,335 A | * | 12/2000 | Ishida et al. | 310/68 D |
| 7,498,701 B2 | * | 3/2009 | Kikuchi et al. | 310/68 B |
| 7,545,061 B2 | * | 6/2009 | Asao et al. | 310/58 |
| 7,759,831 B2 | * | 7/2010 | Yagi | 310/68 R |
| 2006/0125240 A1 | * | 6/2006 | Kato et al. | 290/31 |

FOREIGN PATENT DOCUMENTS

| | | |
|---|---|---|
| JP | 9-19119 A | 1/1997 |
| JP | 2002-354736 A | 12/2002 |
| JP | 2008-005678 A | 1/2008 |

* cited by examiner

*Primary Examiner* — Dang D Le
(74) *Attorney, Agent, or Firm* — Sughrue Mion, PLLC (57) ABSTRACT

The electric rotating machine is provided with an intermediate plate having a power circuit connection portion that is connected with an outgoing lead drawn out from a power circuit unit and an armature winding connection portion that is connected with the power circuit connection portion and an outgoing lead drawn out from an armature winding. The power circuit connection portion and the armature winding connection portion are arranged at desired positions and outgoing leads from the armature winding of the stator are drawn out in such a way as to fall within a given space, so that intermediate connection lines for connecting windings can be shortened. Accordingly, not only the breakage of an intermediate connection line caused by a vibration can be prevented, but also the switching elements can separately be arranged so as to reduce thermal interference between the switching elements; therefore, the switching elements can effectively be cooled.

7 Claims, 5 Drawing Sheets

ELECTRIC ROTATING MACHINE

BACKGROUND OF THE INVENTION

1. Field of the Invention

The present invention relates to an electric rotating machine, for a vehicle or the like, that is coupled with an engine, and particularly to the structure thereof.

2. Description of the Related Art

To date, there has been disclosed an in-vehicle AC generator in which there are formed two slots for each polarity and each phase in a stator iron core configured of laminated magnetic thin plates, and a set of U-phase, V-phase, and W-phase windings is configured with phase windings formed of coil conductors inserted in the slots (e.g., refer to Japanese Patent Application Laid-Open No. 2002-354736).

In a conventional in-vehicle AC generator disclosed in Japanese Patent Application Laid-Open No. 2002-354736, a set of U-phase, V-phase, and W-phase windings is formed by connecting in series respective phase windings whose phases are different from one another by an electric angle of 30° by means of outgoing leads for phase-to-phase connection provided at the respective ends of the phase windings. These phase windings are connected with one another by means of neutral-point outgoing leads, so that a set of Y-connected three-phase AC armature windings is configured.

In a conventional in-vehicle AC generator configured in such a way as described above, each of the outgoing leads for connecting the phase windings in series with one another is pulled out from the end of the corresponding phase winding and disposed on the coil end of the corresponding phase winding; similarly, the neutral-point outgoing lead is also disposed on the coil end of the corresponding phase winding.

Additionally, to date, there has been disclosed an in-vehicle electric rotating machine in which the high-potential switching elements out of switching elements that are included in an electric-power conversion device are fixed to a high-potential heat sink and the low-potential switching elements are fixed to a low-potential heat sink, and the switching elements are cooled by use of these heat sinks (e.g., refer to Japanese Patent Application Laid-Open No. 2008-5678).

The conventional in-vehicle electric rotating machine disclosed in Japanese Patent Application Laid-Open No. 2008-5678 is configured in such a way that a battery terminal is provided in the high-potential heat sink for each phase, and in accordance with the mounting situation of the electric rotating machine, selection of the battery terminals can be performed. Furthermore, outgoing leads are drawn from the switching elements, diodes, and the like for connecting them with the armature winding.

In general, in an in-vehicle electric rotating machine, the shorter the lengths of the phase-to-phase connection outgoing lead and the neutral-point outgoing lead are, the smaller the risk of breakage of the outgoing leads becomes and the higher the reliability of the electric rotating machine becomes. The arrangements and the lengths of the phase-to-phase connection outgoing leads and the neutral-point outgoing leads change depending on the outgoing positions of the outgoing leads from the switching elements and the diodes and on the number of phases of the armature winding; therefore, in order to reduce the lengths of the phase-to-phase connection outgoing leads and the neutral-point outgoing leads, it is required to make the positions of the outgoing leads from the switching elements and the diodes to be concentrated.

Meanwhile, in the case where an electric-power conversion device is operated as an inverter and an electric rotating machine is utilized as a motor for driving a vehicle, a large armature current for producing large torque flows into switching elements, whereby a large amount of heat is generated in the switching elements. Accordingly, in terms of effective cooling of the switching elements, it is advantageous to arrange the heat sinks to which the switching elements are fixed, in such a way as to be dispersed around the center axis of the electric rotating machine.

Accordingly, in a conventional in-vehicle electric rotating machine, it has been difficult to strike a good balance between shortening the phase-to-phase connection outgoing leads and the neutral-point outgoing leads and effectively cooling the switching elements. In other words, in the case where, in order to shorten the phase-to-phase connection outgoing leads and the neutral-point outgoing leads, the switching elements are arranged in a concentrated manner, the electric rotating machine becomes high-temperature due to the concentration of the switching elements that become high-temperature in a narrow space. In contrast, in the case where, in order to effectively cool the switching elements, the heat sinks to which the switching elements are fixed are arranged in a dispersed manner around the center axis of the electric rotating machine, the positions of the outgoing leads for connecting the switching elements and the diodes are dispersed; as a result, the lengths of the phase-to-phase connection outgoing leads and the neutral-point outgoing leads become large, whereby the risk of the breakage of these outgoing leads is enlarged.

SUMMARY OF THE INVENTION

The present invention has been implemented in order to solve the foregoing problems in a conventional electric rotating machine; the objective thereof is to provide a high-reliability and high-productivity electric rotating machine that is obtained by securing the coolability of the switching element and simplifying the connection of outgoing leads and the like.

An electric rotating machine according to the present invention is provided with a stator provided with an armature winding; a pair of housings that are arranged at both ends of the stator in the axis direction thereof and support the stator; a rotor provided with a magnetic-field winding and a magnetic-field iron core and pivotably supported by the pair of housings; a cooling fan provided at an end of the rotor in the axis direction thereof; and a switching element for controlling an armature current that flows in the armature winding. The electric rotating machine is characterized by having a power circuit unit fixed to one of the pair of housings; a magnetic-field circuit unit provided with the switching element for controlling an armature current that flows in the armature winding; a heat sink fixed to the one of the pair of housings and provided with a cooling fin for cooling the switching element in the power circuit unit; and an intermediate plate fixed to the one of the pair of housings and having a power circuit connection portion that is connected with an outgoing lead drawn out from the power circuit unit and an armature winding connection portion that is connected with the power circuit connection portion and an outgoing lead drawn out from the armature winding.

The electric rotating machine is provided with an intermediate plate having a power circuit connection portion that is connected with an outgoing lead drawn out from a power circuit unit and an armature winding connection portion that is connected with the power circuit connection portion and an outgoing lead drawn out from an armature winding. Therefore, the power circuit connection portion and the armature winding connection portion can be arranged at desired positions and outgoing leads from the armature winding of the stator are drawn out in such a way as to fall within a given space, so that intermediate connection lines for connecting windings can be shortened. Accordingly, not only the breakage of an intermediate connection line caused by a vibration can be prevented, but also the switching elements can separately be arranged so as to reduce thermal interference between the switching elements; therefore, the switching elements can effectively be cooled.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
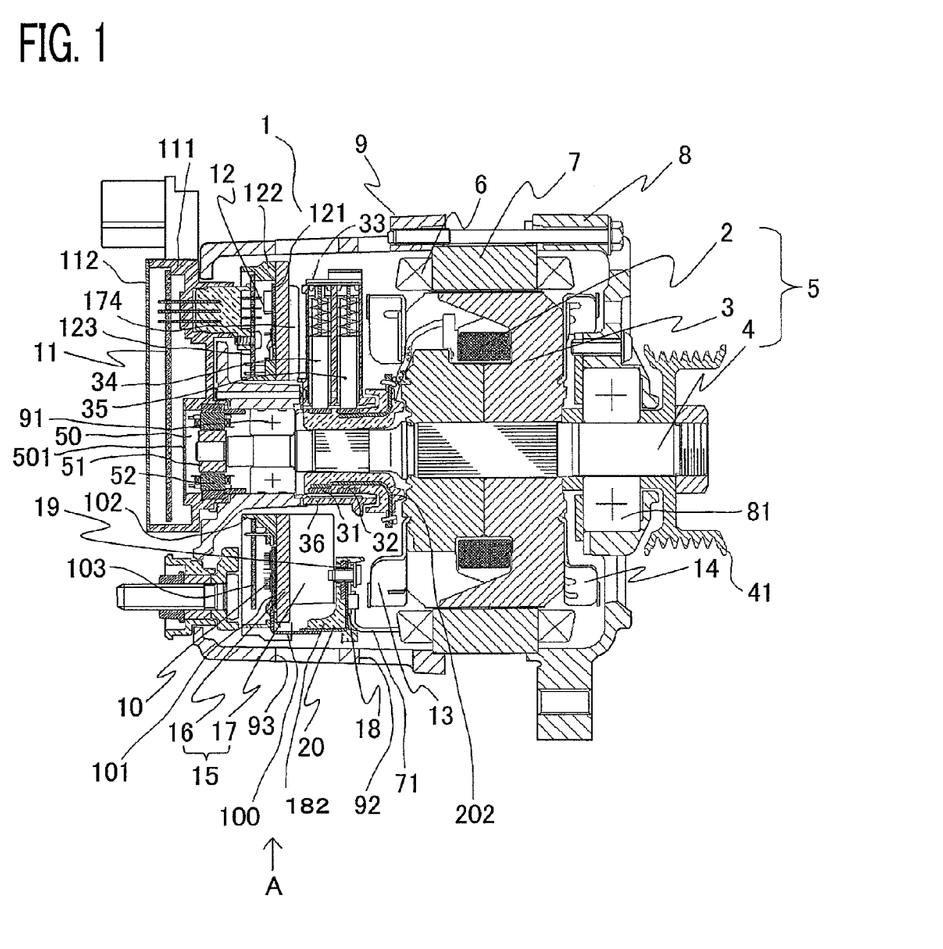
FIG. 1 is a longitudinal cross-sectional view of an in-vehicle electric rotating machine according to Embodiment 1 of the present invention.
Figure 2:
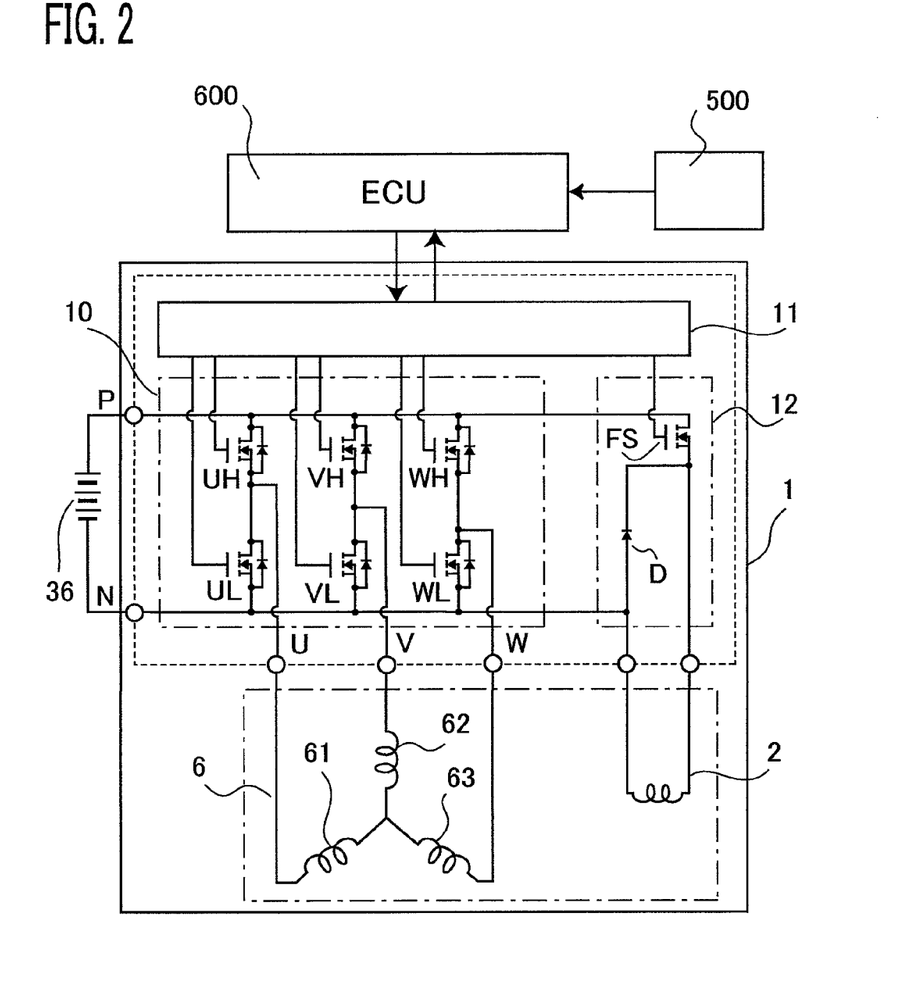
FIG. 2 is an electric circuit diagram of an in-vehicle electric rotating machine according to Embodiment 1 of the present invention.

An in-vehicle electric rotating machine according to Embodiment 1 of the present invention will be explained below with reference to the accompanying drawings. FIG. 1 is a longitudinal cross-sectional view of an in-vehicle electric rotating machine according to Embodiment 1 of the present invention; FIG. 2 is an electric circuit diagram of an in-vehicle electric rotating machine according to Embodiment 1 of the present invention. In the following explanation, one side, of an in-vehicle electric rotating machine, at which a pulley to be coupled with the output axle of an engine is provided will be referred to as the "front-side", and the other side opposite to the front-side will be referred to as the "rear-side". In FIGS. 1 and 2, an in-vehicle electric rotating machine 1 is provided with a front-side housing 8, a rear-side housing 9, a rotor 5 whose shaft 4 is pivotably held by a front-side bearing 81 supported by the front-side housing 8 and a rear-side bearing 91 supported by the rear-side housing 9, and a stator 7 fixed in such a way as to be inserted between the front-side housing 8 and the rear-side housing 9.

The stator 7 has an armature winding 6 formed of a coil conductor inserted into a slot provided in a laminated iron core. The armature winding 6 is provided with three-phase Y-connected windings 62, 61, and 63 for U-phase, V-phase, and W-phase. The rotor 5 includes a claw-pole magnetic-field iron core 3 and a magnetic-field winding 2 held around the magnetic-field iron core 3.

A pulley 41 fixed on the front-side end of the shaft 4 is coupled with an engine by the intermediary of a belt (unillustrated). A pair of slip rings 31 and 32 fixed at the rear side of the shaft 4 are in contact with a pair of brushes 34 and 35 slidably held by a brush holder 33 that is fixed inside the rear-side housing 9. The pair of slip rings 31 and 32 are connected with a pair of magnetic-field winding outgoing leads 201 and 202 drawn out from the magnetic-field winding 2. Part of the pair of slip rings 31 and 32 is covered with an insulator 36 fixed to the rear-side housing 9, by the intermediary of a gap.

A front-side cooling fan 14 and a rear-side cooling fan 13 are fixed to the front-side axis-direction end face and the rear-side axis-direction end face, respectively, of the rotor 5, and rotate integrally with the rotor 5. A power circuit unit 10 as an electric-power conversion circuit unit includes six switching elements UH, VH, WH, UL, VL, and WL that configure a three-phase bridge circuit. The switching elements UH, VH, and WH form U-phase, V-phase, and W-phase positive-polarity arms of the three-phase bridge circuit; the switching elements UL, VL, and WL form U-phase, V-phase, and W-phase negative-polarity arms of the three-phase bridge circuit.

Based on a signal from a group of sensors 500 that detects vehicle information such as a vehicle speed, a command signal from a vehicle driver, or the like, ECU 600 generates a control command and then transmits the control command to a control circuit unit 11. Based on the control command from ECU 600, the control circuit unit 11 generates gate signals and then inputs the gate signals to the gates of the switching elements UH, VH, WH, UL, VL, and WL. Based on the gate signals from the control circuit unit 11, the switching elements UH, VH, WH, UL, VL, and WL perform switching operation, so that the power circuit unit 10 acts as an inverter or a converter.

The control circuit unit 11 is contained and fixed in a resin-made control-circuit case 111 fixed to the axis-direction end of the rear-side housing 9; the surface of the control circuit unit 11 is covered with a lid 112. With regard to a rotor-position detection device 50 that detects the position of the rotor 5 of the in-vehicle electric rotating machine 1, a rotor 51 thereof is fixed to the rear-side end of the shaft 4, and a stator 52 thereof is fixed to the control-circuit case 111. The rear-side axis-direction end face of the rotor-position detection device 50 is covered with a lid 501 mounted in the control-circuit case 111. The output signal, of the rotor-position detection device 50, that is inputted to the control circuit unit 11 is utilized for determining the timing at which the gate signals are generated.

The switching elements UH, VH, WH, UL, VL, and WL in the power circuit unit 10 are mounted on a power circuit printed board 101 and fixed to a heat sink base 16 included in a heat sink 15, as described later, by the intermediary of the power circuit printed board 101. A magnetic-field circuit unit 12 includes a magnetic-field current control switching element FS and a diode D for preventing the reverse flow of a magnetic-field current and control a magnetic-field current in such a way that the in-vehicle electric rotating machine 1 can produce required torque and generate required electric power. The magnetic-field current controlled by the magnetic-field current control switching element FS is supplied from the pair of brushes 34 and 35 to the magnetic-field winding 2 via the pair of slip rings 31 and 32. The magnetic-field current control switching element FS and the diode D are mounted on a magnetic-field circuit printed board 121 that is fixed to the heat sink base 16, as described later.

Figure 3:
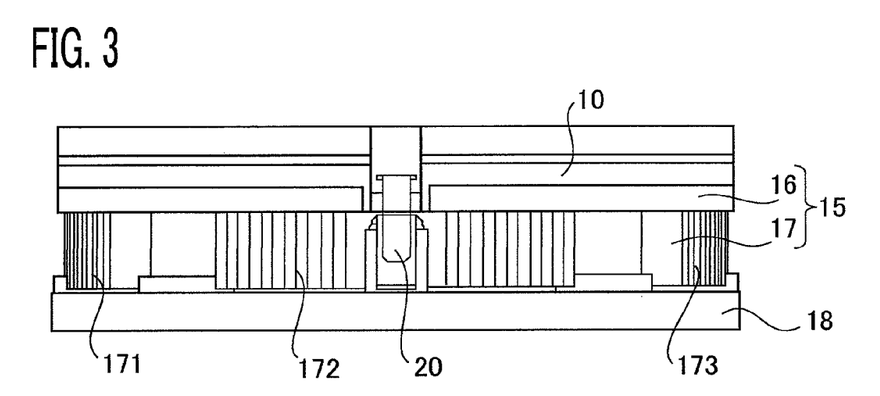
FIG. 3 is a side view of an intermediate plate and a heat sink of an in-vehicle electric rotating machine according to Embodiment 1 of the present invention, as viewed in the direction indicated by the arrow "A" in FIG. 1.

FIG. 3 is a side view of an intermediate plate and a heat sink of an in-vehicle electric rotating machine according to Embodiment 1 of the present invention, as viewed in the direction indicated by the arrow "A" in FIG. 1. In FIGS. 1 and 3, the heat sink 15 fixed inside the rear-side housing 9 is configured with the heat sink base 16 formed in the shape of a ring and cooling fins 17 fixed to the front-side surface of the heat sink base 16, and is disposed in such a way as to surround the shaft 4. As is the case with the rear-side housing 9, the electric potential of the heat sink 15 is kept to be the earth potential.

The cooling fins 17 include U-phase cooling fin 171, V-phase cooling fin 172, W-phase cooling fin 173, and magnetic-field cooling fin 174 shown in FIG. 1. In the bottom half, in FIG. 1, of the in-vehicle electric rotating machine 1, the U-phase cooling fin 171, the V-phase cooling fin 172, the W-phase cooling fin 173 are arranged in such a way as to be spaced by approximately 90° apart from one another with respect to the shaft 4 and fixed to the front-side surface of the heat sink base 16. The magnetic-field cooling fin 174 is fixed to the front-side surface of the heat sink base 16 in the upper portion, in FIG. 1, of the in-vehicle electric rotating machine 1.

Next, in FIGS. 1 to 3, the magnetic-field circuit printed board 121 is surrounded by a resin-made magnetic-field circuit case 122 and fixed in such a way as to be directly in contact with the rear-side surface of the heat sink base 16. The surface of the magnetic-field circuit printed board 121 is covered with a lid 123 mounted in the magnetic-field circuit case 122.

The power circuit printed board 101 is configured with a U-phase printed board, a V-phase printed board, and a W-phase printed board that are separated from one another; on the U-phase printed board, there is mounted a pair of switching elements UH and UL that correspond to U-phase; on the V-phase printed board, there is mounted a pair of switching elements VH and VL that correspond to V-phase; on the W-phase printed board, there is mounted a pair of switching elements WH and WL that correspond to W-phase.

The U-phase printed board, the V-phase printed board, and the W-phase printed board are surrounded by respective resin-made U-phase power circuit case, V-phase power circuit case, and W-phase power circuit case and fixed in such a way as to be directly in contact with the rear-side surface of the heat sink base 16. The surfaces of the U-phase printed board, the V-phase printed board, and the W-phase printed board are covered with respective lids mounted in the power circuit cases for each phase. In FIG. 1, out of the power circuit cases and lids for each phase, only a V-phase power circuit case 102 and a lid 103 thereof are illustrated.

In the bottom half, in FIG. 1, of the in-vehicle electric rotating machine 1, the U-phase printed board, the V-phase printed board, and the W-phase printed board covered with the respective power circuit cases and the respective lids are arranged in such a way as to be spaced by approximately 90° apart from one another with respect to the shaft 4 and fixed to the rear-side surface of the heat sink base 16. Accordingly, the U-phase printed board, the V-phase printed board, and the W-phase printed board face the U-phase cooling fin 171, V-phase cooling fin 172, and the W-phase cooling fin 173, respectively, by the intermediary of the heat sink base 16.

The heat produced by the switching elements UH, VH, WH, UL, VL, and WL is transferred to the heat sink base 16 by the intermediary of the U-phase printed board, the V-phase printed board, and the W-phase printed board that configure the power circuit printed board 101, and radiated mainly by the U-phase cooling fin 171, V-phase cooling fin 172, and the W-phase cooling fin 173 that face the U-phase printed board, the V-phase printed board, and the W-phase printed board, respectively. The heat produced by the magnetic-field current control switching element FS is transferred to the heat sink base 16 by the intermediary of the magnetic-field circuit printed board 121, and radiated mainly by the magnetic-field cooling fin 174.

Figure 4:
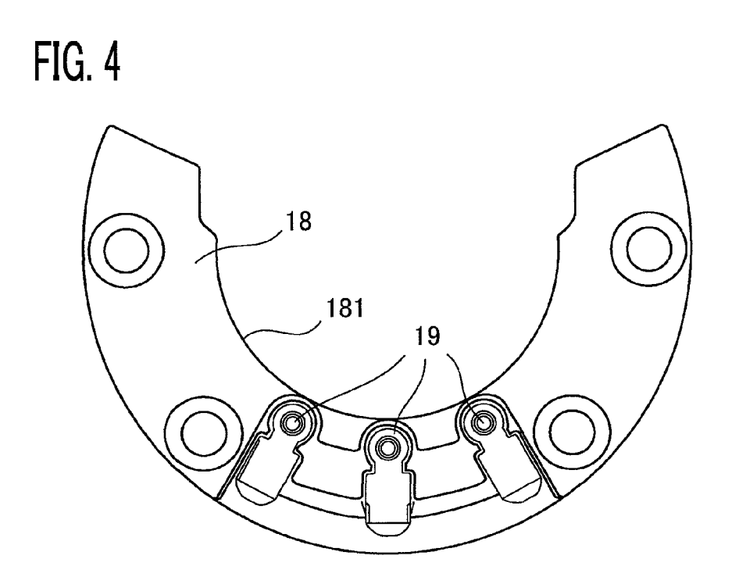
FIG. 4 is a rear-side plan view of an intermediate plate of an in-vehicle electric rotating machine according to Embodiment 1 of the present invention.
Figure 5:
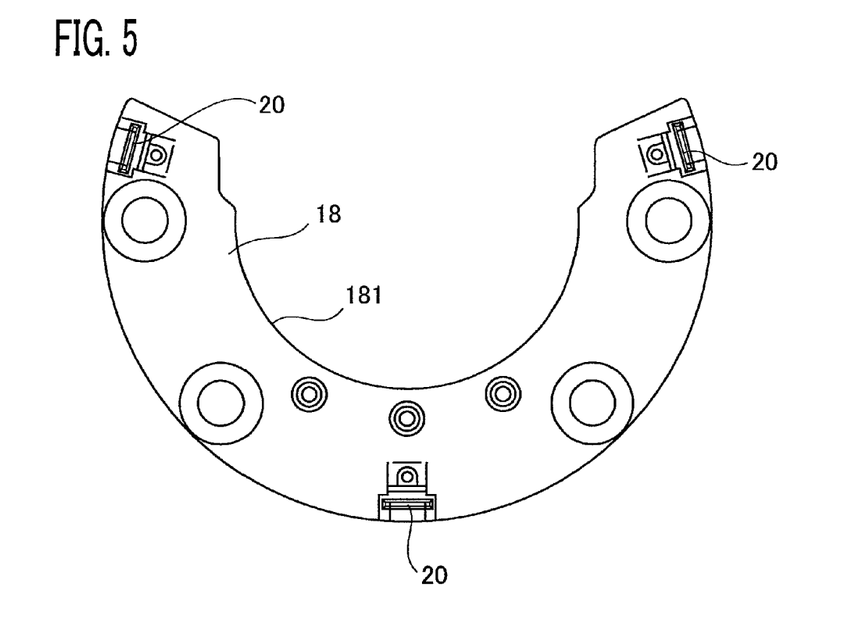
FIG. 5 is a front-side plan view of an intermediate plate of an in-vehicle electric rotating machine according to Embodiment 1 of the present invention.

Next, an intermediate plate 18 will be explained. FIG. 4 is a front-side plan view of an intermediate plate of an in-vehicle electric rotating machine according to Embodiment 1 of the present invention; FIG. 5 is a rear-side plan view of an intermediate plate of an in-vehicle electric rotating machine according to Embodiment 1 of the present invention. In FIGS. 1, 4, and 5, the intermediate plate 18 formed of an insulator such as resin is approximately U-shaped, disposed in such a way as to surround the bottom half to part of the top half, in FIG. 1, of the shaft 4, and fixed inside the rear-side housing 9.

An inner circumference 181, at the radially middle portion, of the intermediate plate 18 faces the outer circumference of the insulator 36 by the intermediary of a gap. On the peripheral portion 182 of the rear-side surface of the intermediate plate 18, there is provided a semi-tubular protecting portion that covers part of the outer circumference of the cooling fins 17 by the intermediary of a gap. The intermediate plate 18 is disposed in such a way that the rear-side surface thereof faces the axis-direction end face of the cooling fin 17 of the heat sink 15; the cooling fin 17 and the intermediate plate 18 configure an air path, described later, through which cooling air passes.

In Embodiment 1 of the present invention, the cooling fin 17 of the heat sink 15 is adapted to extend from the front-side surface of the heat sink base 16 toward the rear-side surface of the intermediate plate 18. The intermediate plate 18 is disposed between the heat sink 15 and the rear-side cooling fan 13 in the rear-side housing 9 of the in-vehicle electric rotating machine 1.

In the vicinity of the middle of the front-side surface of the intermediate plate 18, there are fixed three armature winding connection portions 19 to be connected with three outgoing leads 71 drawn out from the U-phase winding 62, the V-phase winding 61, and the W-phase winding 63 of the armature winding 6 in the stator 7. The three armature winding connection portions 19 are arranged in such a way as to concentrate at the middle portion of the intermediate plate 18.

On the rear-side surface of the intermediate plate 18, there are fixed three power circuit connection portions 20. These power circuit connection portions 20 are separately arranged at both end portions and the middle portion of the intermediate plate 18, extend from the rear-side surface to the front-side surface of the intermediate plate 18 by way of the outer circumference portions, and are connected with the respective three armature winding connection portions 19.

The V-phase power circuit connection portion 20 and the V-phase armature winding connection portion 19 are arranged at the middle portion of the intermediate plate 18; therefore, as illustrated in FIG. 1, the V-phase power circuit connection portion 20 extending in the radial direction of the intermediate plate 18 is connected with the armature winding connection portion 19. The U-phase power circuit connection portion 20 and the W-phase power circuit connection portion 20 are arranged at both end portions of the intermediate plate 18; therefore, the respective power circuit connection portions (not illustrated) extending along the inner circumference 181 on the front-side surface of the intermediate plate 18 are connected with the U-phase and W-phase armature winding connection portions 19 that are arranged at the middle portion of the intermediate plate 18.

For the respective armature winding connection portions 19 that are arranged in a concentrated manner at the middle portion of the intermediate plate 18, the outgoing leads 71 for U-phase, V-phase, and W-phase of the armature winding 6 are drawn out in a concentrated manner at the bottom portion, in FIG. 1, of the armature winding 6; unlike a conventional electric rotating machine, the outgoing leads 71 for U-phase, V-phase, and W-phase are connected with the corresponding armature winding connection portions 19, without being drawn out and extended to the winding ends of the armature winding 6.

With regard to the U-phase printed board, V-phase printed board, and W-phase printed board, of the power circuit unit 10, that are separately arranged on the heat sink base 16, the outgoing leads 100 are drawn out from the respective connection portions of the pairs of switching elements that form the positive-polarity arm and the negative-polarity arm for the corresponding phase; the position of the outgoing lead 100 for each phase corresponds to the position of the power circuit connection portion 20 for the corresponding phase provided on the intermediate plate 18. Accordingly, each of the outgoing leads 100 is connected with the corresponding power circuit connection portion 20 with the shortest distance in which the outgoing lead 100 slightly extends from the vicinity of the cooling fin 15 toward the intermediate plate 18 in the axis direction of the in-vehicle electric rotating machine 1.

In the in-vehicle electric rotating machine 1, according to Embodiment 1 of the present invention, which is configured as described above, ECU 600 generates a control command based on vehicle information from the sensors 500 and a command from a vehicle driver, and then transmits the control command to the control circuit unit 11. The control circuit unit 11 generates gate signals based on the control command from ECU 600, and then inputs the gate signals to the switching elements UH, VH, WH, UL, VL, and WL of the power circuit unit 10. Based on the inputted gate signals, the switching elements UH, VH, WH, UL, VL, and WL perform switching operation.

In the case where the in-vehicle electric rotating machine 1 is operated as a motor, by switching-controlling the switching elements UH, VH, WH, UL, VL, and WL as an electric-power conversion circuit unit, the power circuit unit 10 is operated as an inverter. In other words, DC power supplied from a battery 36 is converted into three-phase AC power by the power circuit unit 10 that operates as an inverter and supplied to the U-phase winding, V-phase winding, and W-phase winding of the armature winding 6, via the outgoing leads 100 of each phase of the power circuit unit 10, the power circuit connection portions 20 and the armature winding connection portions 19 provided on the intermediate plate 18, and the outgoing leads 71 of the armature winding 6. As a result, the in-vehicle electric rotating machine 1 operates as a motor so as to drive the engine via the pulley 41 and the belt.

In this situation, in order to adjust the driving torque of the in-vehicle electric rotating machine 1 as a motor, the magnetic-field current supplied from the battery 36 to the magnetic-field winding 2 via the slip rings 31 and 32 is adjusted to be a desired value through switching operation of the switching element FS in the magnetic-field circuit unit 12.

In contrast, in the case where the in-vehicle electric rotating machine 1 is operated as an electric power generator, by switching-controlling the switching elements UH, VH, WH, UL, VL, and WL as an electric-power conversion circuit unit, the power circuit unit 10 is operated as a converter. In other words, the three-phase AC power induced across the armature winding 6 through the rotation of the rotor 5 that is driven by the engine by the intermediary of the belt and the pulley 41 is supplied to the power circuit unit 10 via the outgoing leads 71 of the armature winding 6, the armature winding connection portions 19 and the power circuit connection portions 20 provided on the intermediate plate 18, and the outgoing leads 100 of the power circuit unit 10, and then converted into DC electric power by the power circuit unit 10 that operates as a converter and supplied to the battery 36.

In this situation, in order to adjust the power generation amount of the in-vehicle electric rotating machine 1 as an electric power generator, the magnetic-field current supplied from the battery 36 to the magnetic-field winding 2 via the slip rings 31 and 32 is adjusted to be a desired value through switching operation of the switching element FS in the magnetic-field circuit unit 12.

When the in-vehicle electric rotating machine 1 operates as a motor or an electric power generator, due to the rotation of the rotor 5, the rear-side cooling fan 13 and the front-side cooling fan 14 also rotate at the same time. When the rear-side cooling fan 13 rotates, cooling air is absorbed into the rear-side housing 9 through an air inlet 93 provided in the peripheral portion of the rear-side housing 9, passes through a cooling air path configured with the cooling fin 17 of the heat sink 15 and the intermediate plate 18, reaches the rear-side cooling fan 13, and then exhausted through an air outlet 92 formed in the peripheral portion of the rear-side housing 9.

This air flow cools the cooling fin 16 of the heat sink, whereby the switching elements UH, VH, WH, UL, VL, and WL of the power circuit unit 10 are effectively cooled.

In the in-vehicle electric rotating machine according to Embodiment 1 of the present invention, an intermediate plate for connecting the outgoing leads of the armature winding with the outgoing leads of the power circuit unit is provided; therefore, the positions of the connection portions where the outgoing leads of the armature winding with the outgoing leads of the power circuit unit are connected can be set freely. For that purpose, by making shortest the lengths of the outgoing leads of the armature winding and the outgoing leads from the neutral point in the stator, the outgoing leads are arranged most appropriately so that the reliability for vibration or the like is raised, and U-phase switching elements, V-phase switching elements, and W-phase switching elements of the power circuit unit are separately arranged in order to raise the coolability thereof; therefore, even in the case where the shape and the size of the heat sink is optimized, the outgoing leads of the armature winding can appropriately be connected with the outgoing leads of the power circuit unit. In addition, the intermediate plate can be disposed in such a way as to face the fins of the heat sink in order to form a cooling air path; thus, the heat sink can effectively be cooled.

Moreover, in the in-vehicle electric rotating machine according to Embodiment 1 of the present invention, because the intermediate plate is disposed in such a way as to face the rear-side fan mounted on the rotor, the path for the air taken in by the rear-side fan is limited to be in a space in the vicinity of the middle portion of the intermediate plate, whereby cooling air can pass through an air path configured with the heat sink and the intermediate plate. As described above, by disposing the intermediate plate in such a way as to face the fins of the heat sink and the fan of the rotor, cooling air can accurately hit the cooling fins, whereby the cooling effect can more effectively be utilized; therefore, the coolability of the in-vehicle electric rotating machine can be enhanced.

In Embodiment 1 described above, the intermediate plate is approximately U-shaped; however, it may be ring-shaped depending on the distribution of the connection portions for the connection with the power circuit unit. Because, by making the intermediate plate ring-shaped, the rigidity of the intermediate plate is raised, the vibration resistance of the in-vehicle electric rotating machine can be enhanced. Moreover, because a plane where the intermediate plate and the rear-side fan face each other is formed over the whole circumference, cooling air can be made to flow with less loss. Furthermore, in Embodiment 1, the number of the phases of the armature winding is three; however, the present invention is not limited by the number of the phases.

Embodiment 2

Figure 6:
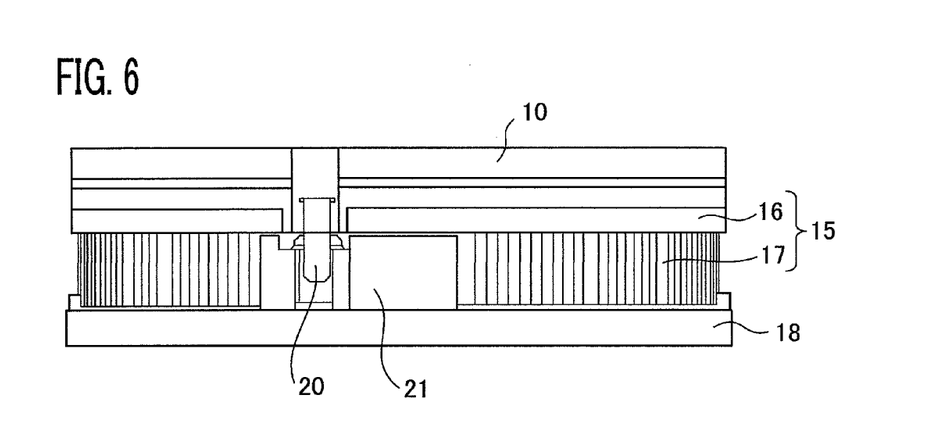
FIG. 6 is a side view of an intermediate plate and a heat sink of an in-vehicle electric rotating machine according to Embodiment 2 of the present invention.

FIG. 6 is a side view of an intermediate plate and a heat sink according to Embodiment 2 of the present invention. In Embodiment 2, on an intermediate plate 18, there is provided a shielding wall 21 for preventing cooling air from flowing into a space where there is provided no cooling fin 17 of a heat sink 15, and integrally with the shielding wall 21, there is disposed a power circuit connection portion 20 for the connection with the outgoing leads from the power circuit unit 10.

In Embodiment 2 of the present invention, the power circuit unit 10 and the intermediate plate 18 are arranged in such a way as to flank the cooling fins 17; it is required to connect the power circuit connection portion 20 that connects the outgoing lead of the armature winding with the outgoing lead of the power circuit unit, in such a way as to cover a place where the cooling fins 17 are formed. However, due to a screw or the like for fixing the heat sink 15 in the electric rotating machine, there is formed a place where no cooling fin can be provided, and if cooling air flows into the place where no cooling fin can be provided, a loss is produced; therefore, in order to prevent cooling air from flowing into the place where no cooling fin can be provided, the shielding wall 21 is provided. As a result, the heat sink can effectively be cooled; by providing the power circuit connection unit 20 in part of the shielding wall 21 on the intermediate plate, it is made possible to prevent air inlets for cooling air from being covered more than necessary.

Embodiment 3

Figure 7:
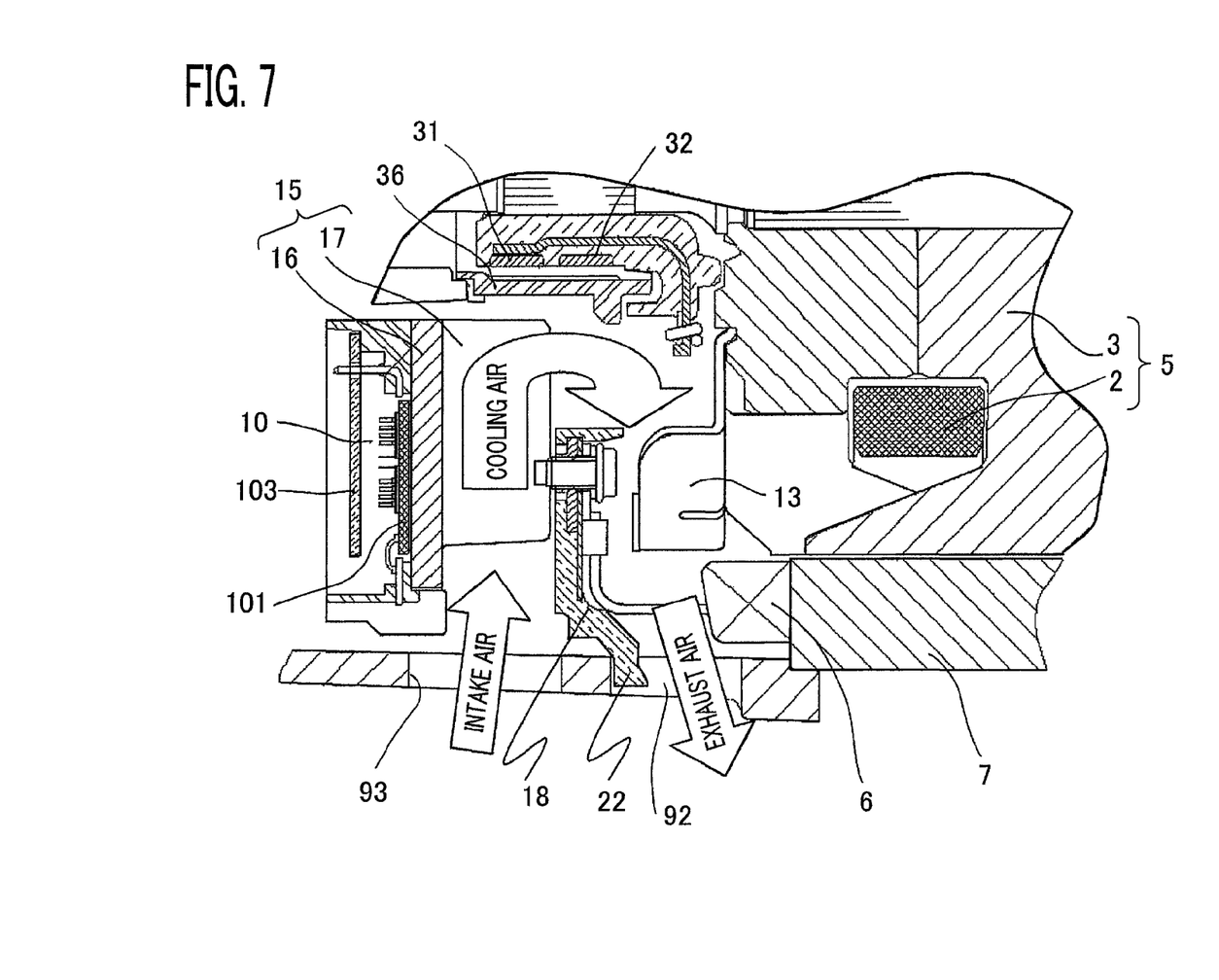
FIG. 7 is a cross-sectional view of the principal parts of an in-vehicle electric rotating machine according to Embodiment 3 of the present invention.

FIG. 7 is a cross-sectional view of principal parts of an electric rotating machine according to Embodiment 3. In Embodiment 3, in order to prevent exhausted cooling air from going toward an air inlet 93 in a rear-side housing 9, an exhausting guide 22 is formed in the peripheral portion of an intermediate plate 18. As a result, it can be prevented that air that has once passed through the electric rotating machine and has been warmed is absorbed again through the air inlet 93; therefore, cooling by the heat sink can effectively be performed.

Various modifications and alterations of this invention will be apparent to those skilled in the art without departing from the scope and spirit of this invention, and it should be understood that this is not limited to the illustrative embodiments set forth herein.

What is claimed is:

1. An electric rotating machine comprising:
a stator provided with an armature winding;
a pair of housings that are arranged at both ends of the stator in the axis direction thereof and support the stator;
a rotor provided with a magnetic-field winding and a magnetic-field iron core and pivotably supported by the pair of housings;
a cooling fan provided at an end of the rotor in the axis direction thereof;
a power circuit unit fixed to one of the pair of housings and provided with a switching element for controlling an armature current that flows in the armature winding;
a magnetic-field circuit unit provided with a switching element for controlling a magnetic-field current that flows in the magnetic-field winding;
a heat sink fixed to the one of the pair of housings and provided with a cooling fin for cooling the switching element in the power circuit unit; and
an intermediate plate fixed to the one of the pair of housings and having a power circuit connection portion that is connected with an outgoing lead drawn out from the power circuit unit and an armature winding connection portion that is connected with the power circuit connection portion and an outgoing lead drawn out from the armature winding.

2. The electric rotating machine according to claim 1, wherein the switching element of the power circuit unit is fixed on one of the sides of the heat sink and the cooling fin is provided on the other side of the heat sink; and one of the sides of the intermediate plate faces the cooling fin and the other side thereof faces the cooling fan.

3. The electric rotating machine according to claim 1, wherein the switching element of the power circuit unit is fixed on one of the sides of the heat sink and the cooling fin is provided at a position, on the other side of the heat sink, that corresponds to the position at which the switching element is fixed; and one of the sides of the intermediate plate faces the cooling fin and the other side thereof faces the cooling fan, and the intermediate plate has a shielding wall for limiting cooling air that flows into a place where no cooling fin of the heat sink is provided.

4. The electric rotating machine according to claim 3, wherein the power circuit connection portion is disposed integrally with the shielding wall of the intermediate plate.

5. The electric rotating machine according to claim 1, wherein the intermediate plate is provided with an exhausting guide for preventing air exhausted from an air outlet provided in the one of the pair of housings from flowing into an air inlet provided in the one of the pair of housings.

6. The electric rotating machine according to claim 1, wherein the intermediate plate is formed to be approximately U-shaped.

7. The electric rotating machine according to claim 1, wherein the intermediate plate is formed to be ring-shaped.

* * * * *